(12) United States Patent
Altmann

(10) Patent No.: US 7,555,693 B2
(45) Date of Patent: *Jun. 30, 2009

(54) AUXILIARY DATA TRANSMITTED WITHIN A DISPLAY'S SERIALIZED DATA STREAM

(75) Inventor: William C. Altmann, San Jose, CA (US)

(73) Assignee: Silicon Image, Inc., Sunnyvale ( * ) Notice: Subject to any disclaimer, the term of this patent is extended or adjusted under 35 U.S.C. 154(b) by 0 days.

This patent is subject to a terminal disclaimer.

(21) Appl. No.: 11/488,515

(22) Filed: Jul. 17, 2006

(65) Prior Publication Data

US 2007/0011552 A1 Jan. 11, 2007

Related U.S. Application Data

(63) Continuation of application No. 09/942,885, filed on Aug. 29, 2001, now Pat. No. 7,143,328.

(51) Int. Cl.
*G06F 11/30* (2006.01)
*G08C 25/00* (2006.01)
*H03M 13/00* (2006.01)
*H04L 1/00* (2006.01)

(52) U.S. Cl. ................................................. 714/746
(58) Field of Classification Search .................. 714/746
See application file for complete search history.

(56) References Cited

U.S. PATENT DOCUMENTS

| 4,139,148 A | | 2/1979 | Scheuneman et al. |
| 5,404,230 A | * | 4/1995 | Hong ............................ 386/9 |
| 5,555,024 A | | 9/1996 | Limberg |
| 5,631,713 A | * | 5/1997 | Hoshino ..................... 348/716 |
| 5,841,430 A | | 11/1998 | Kurikko |
| 5,940,070 A | | 8/1999 | Koo |
| 6,285,403 B1 | * | 9/2001 | Lee ............................ 348/465 |
| 6,654,065 B1 | * | 11/2003 | Sung .......................... 348/525 |
| 6,717,611 B2 | * | 4/2004 | Bartolotta et al. ........... 348/159 |
| 7,143,328 B1 | | 11/2006 | Altmann |

* cited by examiner

*Primary Examiner*—Guy J Lamarre
(74) *Attorney, Agent, or Firm*—Perkins Coie LLP

(57) ABSTRACT

Techniques to transmit auxiliary data are disclosed. One technique includes generating a control signal from a video data enable signal and an auxiliary data enable signal, and combining an auxiliary data signal and a video data signal into a composite data signal using the control signal. Techniques to receive the auxiliary data are also disclosed.

39 Claims, 12 Drawing Sheets

AUXILIARY DATA TRANSMITTED WITHIN A DISPLAY'S SERIALIZED DATA STREAM

RELATED APPLICATION

This application is a continuation of U.S. patent application Ser. No. 09/942,885, filed Aug. 29, 2001, now U.S. Pat. No. 7,143,328 B1 issued on Nov. 28, 2006, which application is hereby incorporated herein by reference.

FIELD OF THE INVENTION

The invention is related generally to the field of signal processing, and in particular to the field of image signal processing.

BACKGROUND OF THE INVENTION

A display is a device that processes data received from a computer processor and outputs a visual display of the data onto a display screen. In a conventional computer system, a video signal is transmitted from the computer processor to the display using a video link, such as a cable. Other data, such as audio signals for example, are transmitted from the computer processor across a separate audio link to the display or to an audio peripheral device such as a speaker.

A computer processor outputs video data across the video link in a video data format. The processor also outputs audio data across the audio link in an audio data format. Thus, conventional computer systems require multiple cables to enable the computer processor to transmit video and audio signals to the display and audio devices. Similarly, additional wires or cables are required to send additional types of data from the computer processor to the display device using conventional approaches. For example, these additional types of data may be brightness control, contrast control, or control of a microprocessor within the display device, and may each require a separate cable.

Another way to send additional data over a video link is to send the data during the video blanking period using a control signal, such as the Hsync signal, to identify the blanking period. However, one lead is needed to transmit the video and additional data to the receiver, and a separate lead is needed to transmit the sync signal from the transmitter to the receiver.

This sending of additional data over a video link using a control signal assumes a constant waveform, e.g., the number of pulses within each period and the polarity of the waveform during each period are the same. However, this seemingly periodic and predictable control signal can lose its periodicity and predictability for various reasons, such as transmission errors or design characteristics. For example, if the additional data is sent assuming that the sync signal will rise at time T but then the sync signal rises at time T−1, the receiver will mistakenly expect that up to the time T the received data is additional data and not video data. Also, in some video scrambling methods, the sync signals may be scrambled such that the behavior of these signals becomes unpredictable. Such unpredictable sync signals can degrade the security of a video transmission or they can degrade the signal integrity of the video transmission itself if the sync signals are used to identify the blanking period.

Furthermore, using a sync signal to identify the blanking period fails when the video link is erratic—in other words, a non-regular or non-standard video mode. In an erratic mode, the blanking period does not occur at regular, periodic intervals. For example, a system that encodes only one pulse of Vsync cannot support a double layer supertwist nematic (DSTN) display because a DSTN display could require two Vsync pulses in a single Vsync blanking period.

Additional problems exist in conventional approaches of sending additional data from a computer to a peripheral such as a display device. For example, if the additional data is control data, such as brightness control for example, this type of data should be relatively error-free so that it can be correctly processed by the receiver. However, in the context of video signals, a conventional control signal transmission channel does not provide the bandwidth to transmit the error status of the additional data as fast as the video channel. Therefore, if the video channel transmits video signals at rates of 25-165 Mega-Hertz (MHz), but the control signal channel transmits the additional signals and error status signals at a maximum rate of 0.4 MHz, the receiver will not be able to detect errors in a timely fashion. Also, the transmission of additional data can be limited by the performance of the receiver, which would have to monitor the additional channel link to detect the error codes.

SUMMARY OF THE INVENTION

Techniques to transmit auxiliary data are disclosed. One technique includes generating a control signal from a video data enable signal and an auxiliary data enable signal, and combining an auxiliary data signal and a video data signal into a composite data signal using the control signal.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Transmitting auxiliary data within a display's serialized data stream is disclosed. This transmitting can include generating a control signal from a video data enable signal and an auxiliary data enable signal, and combining an auxiliary data signal and a video data signal into a composite data signal using the control signal is disclosed. In one embodiment, the transmitting may utilize a digital video interface (DVI) cable, which carries a video data signal, to carry the composite data signal. Thus, the auxiliary data may be sent from a transmitter to a receiver, such as a display, on the DVI link without affecting the video signal.

The method of transmitting may be compatible with existing receivers, yet open a supplemental channel on a single link for auxiliary data to be sent to the receivers. For example, the DVI link can be used with transition minimized differential signaling (TMDS) to enable high-speed video data and video data control signals to be transmitted across a serialized interface without the need for separate wires for the video data control signals. The video data control signals may include data enable (DE), horizontal sync (Hsync), or vertical sync (Vsync) signals, and can be encoded along with the video data into one signal that is transmitted to the receiver on the DVI link. Additional auxiliary data may also be transmitted to the receiver using the signal, or data stream, transmitted across the DVI link. By transmitting auxiliary data using the same DVI link as the encoded TMDS data stream, the interface between the transmitter and receiver does not require additional cables or connectors for sending the auxiliary data, which simplifies and reduces the cost of the interface over conventional interfaces that require a separate cable to transmit auxiliary data from the transmitter to the receiver.

Figure 1A:
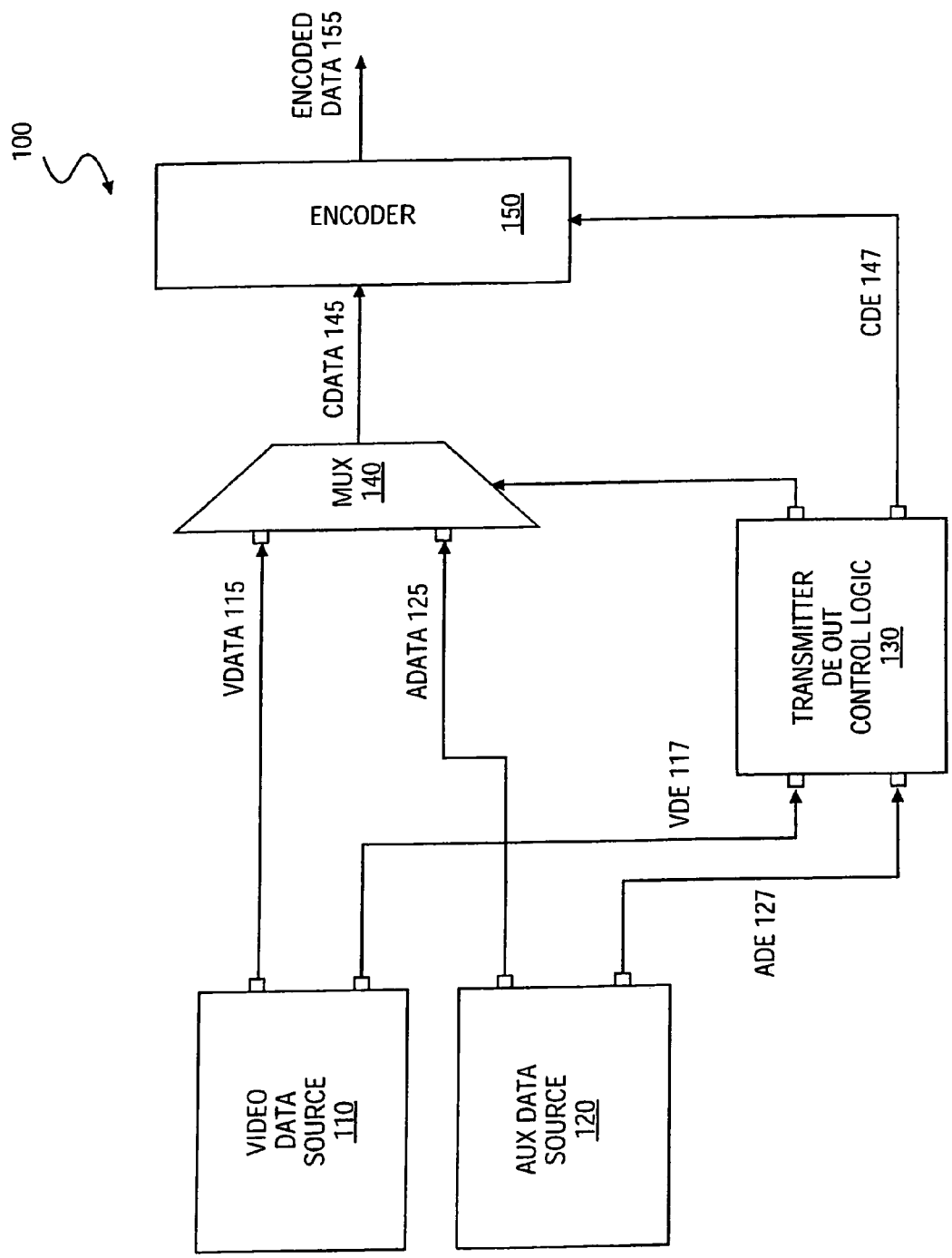
FIGS. 1A and 1B each show a block diagram of one embodiment of a transmitter to transmit auxiliary data on a transition minimized differential signal (TMDS) data stream.

FIG. 1A shows a block diagram of one embodiment of a transmitter 100 to transmit auxiliary data on a TMDS data stream. Video data source 110 outputs video data signal (Vdata) 115 to multiplexer (MUX) 140 and outputs video data enable signal (VDE) 117 to transmitter data enable (DE) control logic 130. The video data signal 115 may include video control signals such as horizontal sync and vertical sync signals for example. Auxiliary data source 120 outputs an auxiliary data signal (Adata) 125 and an auxiliary data enable signal (ADE) 127.

The auxiliary data may be text, audio, still images, picture-in-picture, caption, data link configurations, checksum, or other data, for example. The auxiliary data source may be a source that has the auxiliary data, such as a set top box, a computer, a digital video disk (DVD) player, a game console, or a camcorder, for example. In other applications, the auxiliary data source can be located in a peripheral device such as a joystick, a keyboard, a mouse, or a microphone, for example.

Auxiliary data enable signal (ADE) 127 is sent from auxiliary data source 120 to transmitter DE out control logic 130. The ADE signal 127 provides a separate DE high time during which the auxiliary data signal is sent. A benefit of this ADE high time provided by the ADE signal is that the ADE signal can be detected by a receiver and distinguished from the VDE signal for example by measuring the length of the ADE signal. The receiver can then use the ADE signal to separate the auxiliary data signal from the composite data signal. Because of the ADE signal, the receiver does not have to analyze the specific content of the corresponding received data to determine that the received data is auxiliary data. Similarly, the VDE signal permits the receiver to determine that the corresponding received data is video data without processing the video data.

Figure 1B:
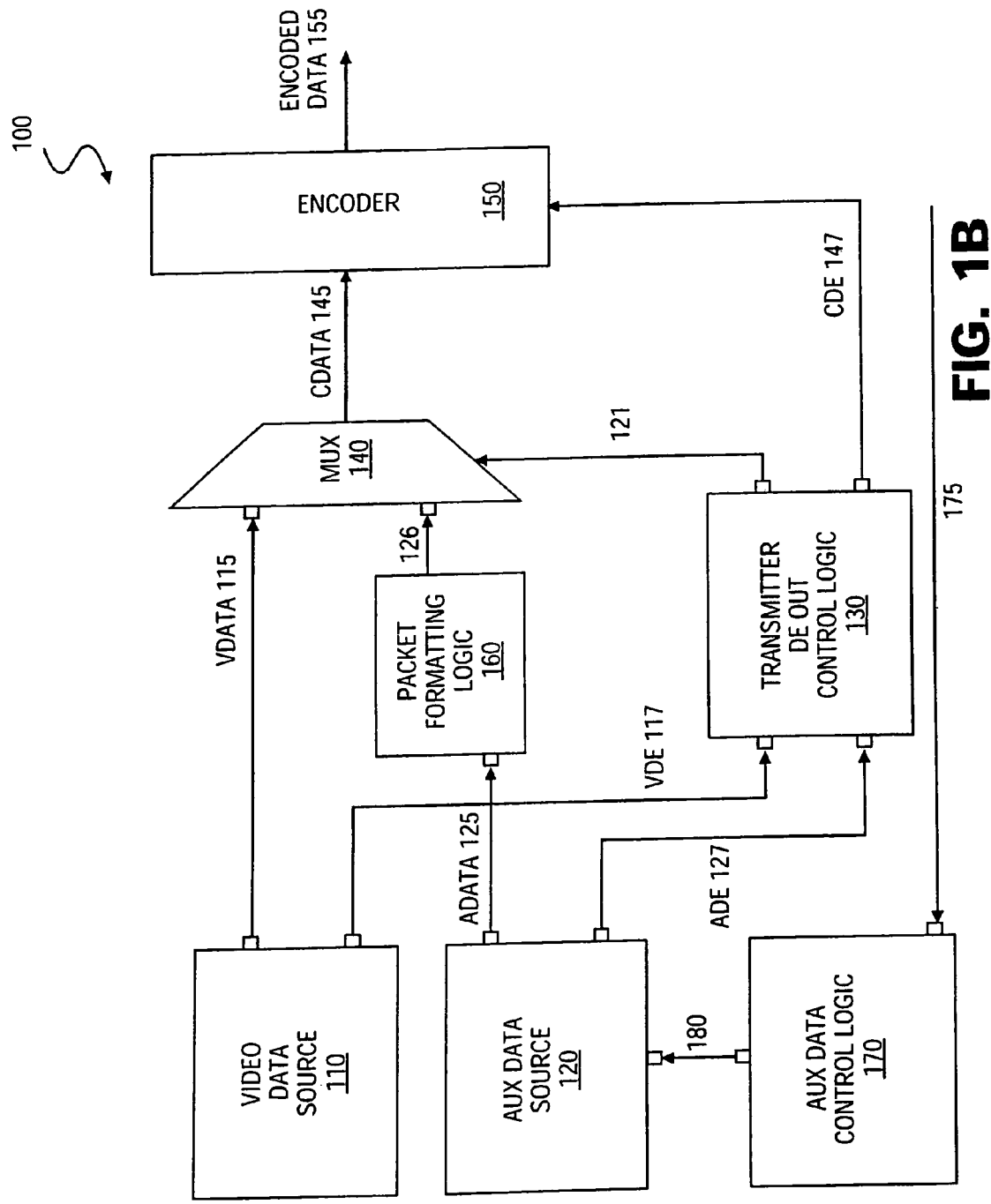

In one embodiment as shown in FIG. 1B, auxiliary data source 120 outputs auxiliary data signal 125 in response to an auxiliary data source control signal 180 received from auxiliary data control logic 170. Auxiliary data control logic 170 receives a display properties signal 175 that includes information about whether the receiver, or display device, is capable of processing the auxiliary data. If signal 175 indicates that the receiver is capable of processing the auxiliary data, then auxiliary data control logic sends an auxiliary data permitted signal 180 to permit auxiliary data source 120 to output auxiliary data signal 125 and auxiliary data enable signal 127. If signal 175 does not indicate that the receiver is capable of processing the auxiliary data, then auxiliary data control logic 170 can generate a prevent auxiliary data signal 180, or not send an auxiliary data permitted signal, to prevent auxiliary data source 120 from outputting ADE signal 127 to transmitter DE out control logic 130. When the transmitter DE out control logic 130 does not receive ADE signal 127, control logic 130 will not enable MUX 140 to multiplex auxiliary data signal 125 into composite data signal 145.

As shown in FIG. 1A, the auxiliary data signal 125 may be output directly from auxiliary data source 120 to MUX 140. In an alternative embodiment of transmitter 100 as shown in FIG. 1B, the auxiliary data signal 125 may be received by packet formatting logic 160. Packet formatting logic 160 may be used to add additional data and data fields to a period, or packet, of auxiliary data signal 125 to generate an enhanced auxiliary data signal 126. The additional data may be used for error detection and error correction.

The logic 160 may add one or more data fields to the auxiliary data packet, such as a packet length field for example. The logic 160 may place data that indicates the length of the auxiliary data packet into the packet length field. The logic may also add a checksum value field containing a checksum value to the auxiliary data packet, so that the checksum of the received auxiliary data packet can be compared to the checksum value, to determine whether the received auxiliary data packet contains an error. One or more error correction fields, which contain error correction data, can also be added to the auxiliary data signal.

The additional data included in the enhanced auxiliary data signal may be useful because information contained in the auxiliary data may be data that needs to be processed without error. A video link, because of its one-way nature, may not include a mechanism for sending an error code back to the host side to cause the host to re-transmit the auxiliary data. Therefore the enhanced auxiliary data sent across the DVI link may allow a receiver to detect errors (such as single-bit errors for example), and may also enable the receiver to correct those errors so that the original auxiliary data can be recovered and processed.

For example, the auxiliary data may be a command sent from the host to the display to increase the display brightness one level. If the command is misinterpreted it may cause the display to become too bright or too dark. In either case, the image on the display may not be visible. The enhanced auxiliary data can be used to detect and correct the error in the brightness command auxiliary data. Thus, the image can be displayed at the proper brightness.

Another example is using auxiliary data to coordinate the encryption and decryption of video signals across the link by sending encryption and decryption control signals from the host to a receiver. If the receiver fails to decode such a control signal because of an error in the received auxiliary data, then the decryption logic in the receiver may fail to decrypt the encrypted signal, thus preventing the video data from being displayed by the receiver. The additional data in the enhanced auxiliary data can be used to detect and correct an error in the received auxiliary data, so that the received encrypted video signal can be decrypted using the control signals from the auxiliary data packets.

As shown in FIG. 1A, video and auxiliary data enable signals 117 and 127 received by transmitter DE out control logic 130 are combined into a composite DE (CDE) signal 147. The CDE signal 147 is then sent from transmitter DE out control logic 130 to encoder 150. Additionally, transmitter DE out control logic 130 causes the MUX 140 to selectively send the video data signal or the auxiliary data signal to encoder 150 by using video and auxiliary data enable signals 117 and 127 to produce multiplexer control signal 121. Thus, control logic 130 controls the output of MUX 140 by sending multiplexer control signal 121 to the MUX 140. The multiplexer control signal 121 received by MUX 140 is used to enable the MUX to combine video data signal 115 and auxiliary data signal 125 into a composite data signal (Cdata) 145. The output of MUX 140 is the composite data signal 145 containing video and auxiliary data that are combined, for example in the time domain, onto the same signal path.

Encoder 150 receives the composite data signal 145 and the composite data enable signal 147, encodes the data signal and the data enable signal to form an encoded data signal, and outputs encoded data signal 155. Data signal 155 may be sent to a receiver that provides horizontal or vertical blanking time. The receiver may be a TMDS receiver that includes a display interface. The transmitter, or host side, may create additional DE high periods in which to encode the auxiliary data. These auxiliary data periods may use the entire data bus width (such as 24 bits for example) to transport auxiliary data. The auxiliary data periods may have a distinctive feature, such as a shorter length for example, from the video DE high periods, so that the TMDS receiver and display system may properly process the auxiliary data. For example, the receiver may process the auxiliary data by stripping the auxiliary data away from the composite data signal.

Figure 2:
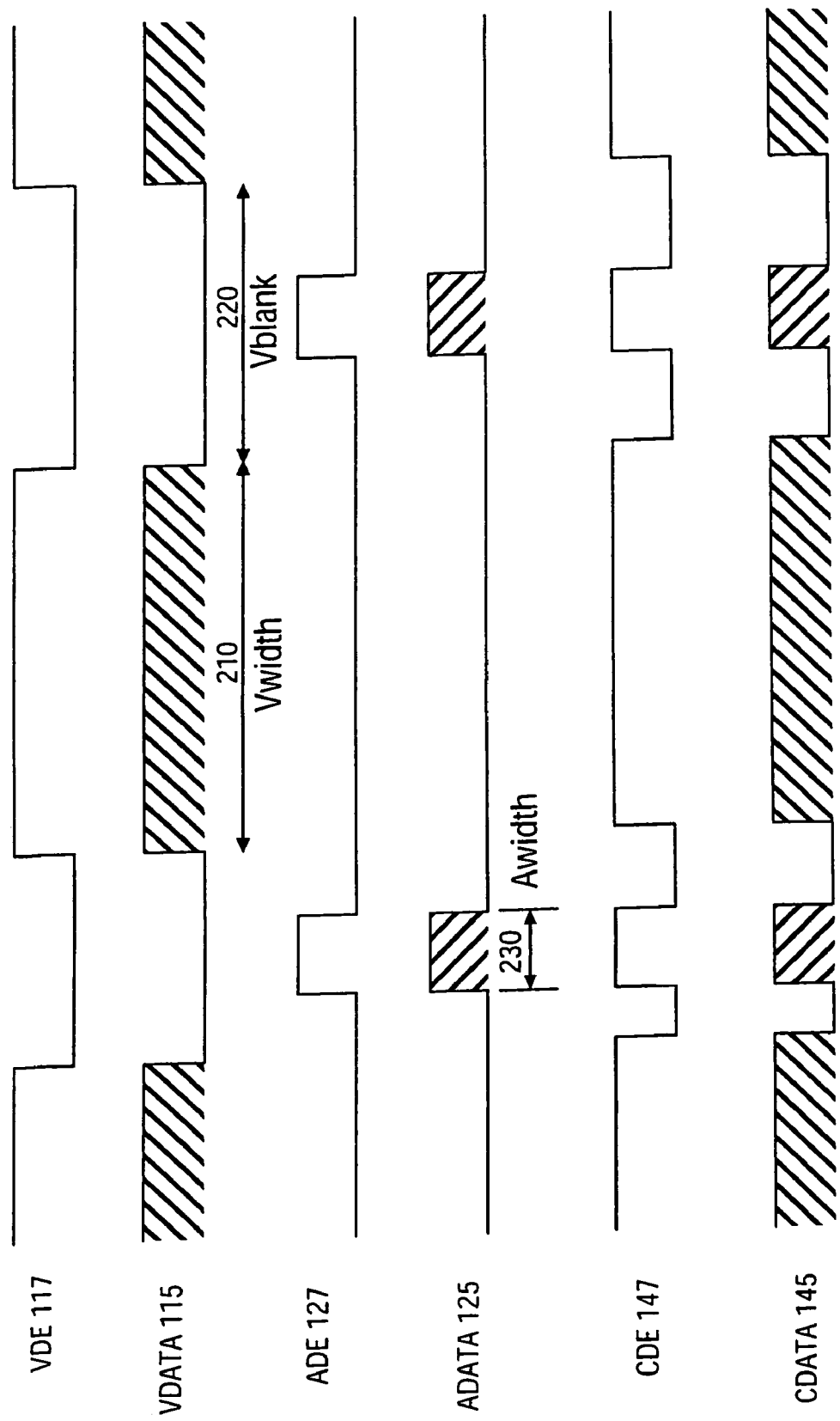
FIG. 2 shows examples of signals, including auxiliary data signals, that may be transmitted on a TMDS data stream.

FIG. 2 shows examples of the signals, including auxiliary data periods and auxiliary data signals, that may be processed by transmitter 100. Video data is transmitted on signal 115 during video data period 210, when the video data enable signal 117 is high. A video blanking period 220 occurs when the data enable signal 117 is low. Auxiliary data is transmitted on signal 125 during auxiliary data period 230, when the auxiliary data enable signal 127 is high. The two data signals, video data signal 115 and auxiliary data signal 125, are combined to form composite data signal 145. The video data enable signal 117 and the auxiliary data enable signal 127 are combined to form composite data enable signal 147. Because the video data period 210 is significantly longer than the auxiliary data period 230, and the auxiliary data period 230 is smaller than the video blanking period 210, the auxiliary data can be inserted into and removed from the multiplexed composite data signal 145 without the need for auxiliary control signals.

Figure 3:
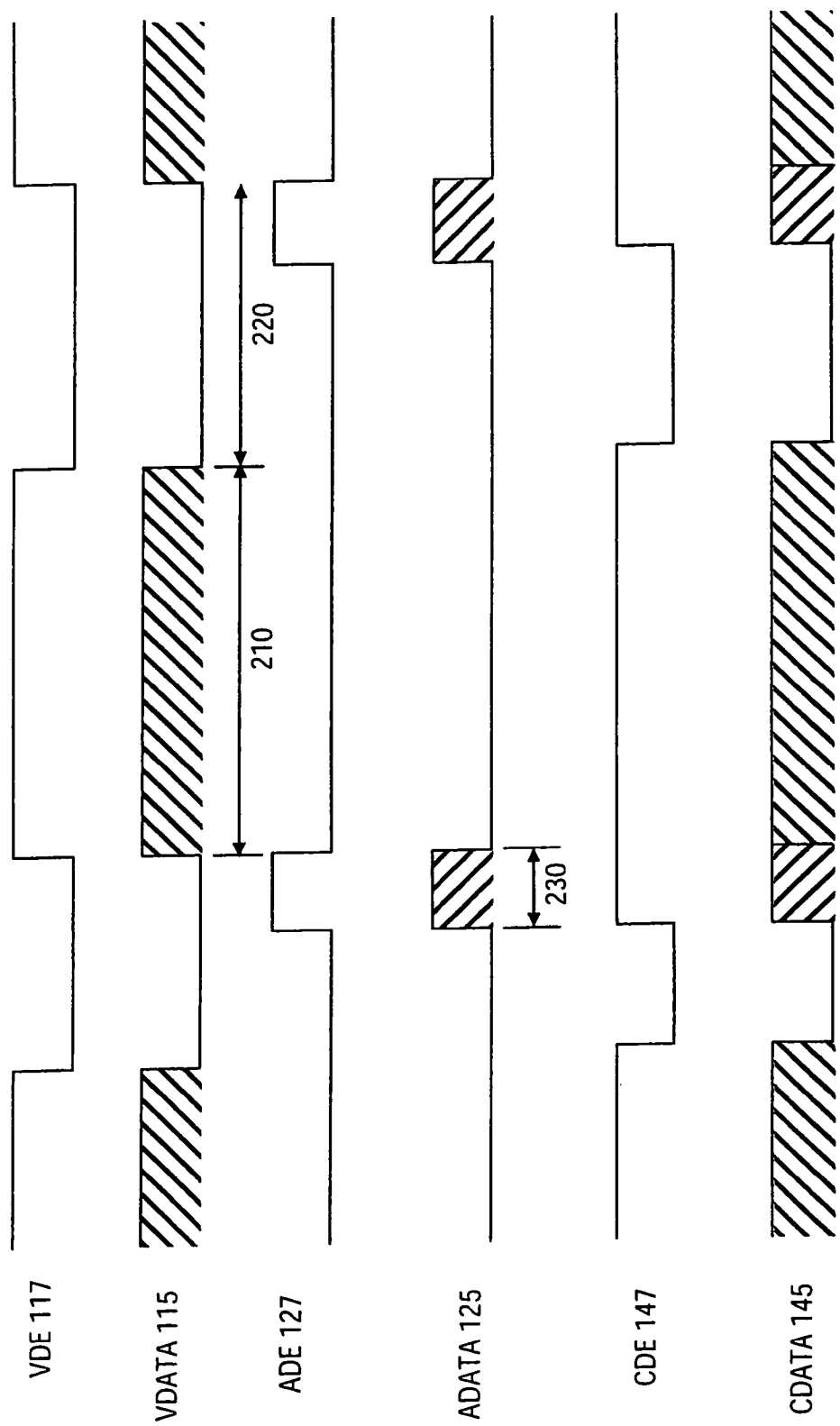
FIG. 3 shows another embodiment of signals that may be transmitted on a TMDS data stream.

FIG. 3 shows another embodiment of signals that may be processed by transmitter 100. In this embodiment, auxiliary data signal 125 is pre-pended onto video data signal 115 to form composite data signal 145. Thus, the auxiliary data signal is merged with the video data signal as a series of extra cycles at the leading edge of each video data period. Similarly, the auxiliary data enable signal 127 is pre-pended onto video data enable signal 117 to form composite data enable signal 147. In an alternative embodiment, the auxiliary data may be appended to the trailing edge of each video data period to form a composite data signal. The auxiliary data enable signal may be appended onto the video data enable signal to form a composite data enable signal. The auxiliary data and the auxiliary data enable signal may be transmitted during a part of video blanking period 220.

Figure 4A:
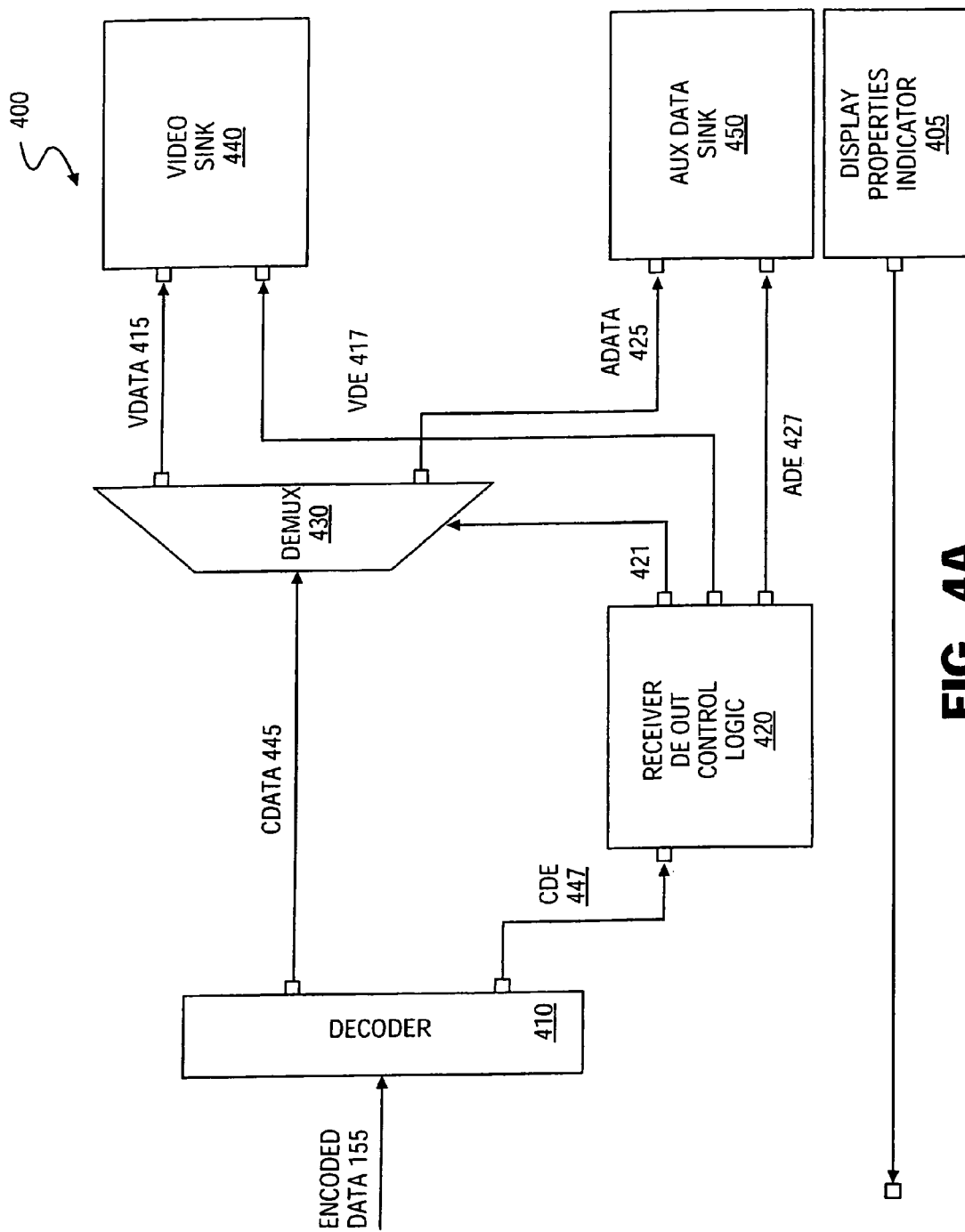
FIGS. 4A and 4B each show a block diagram of one embodiment of a receiver to receive a composite data signal including auxiliary data on a TMDS data stream.

FIG. 4A shows a block diagram of one embodiment of a receiver 400 to receive composite data signal 155, which may include auxiliary data on a TMDS data stream. The receiver may be located in a device such as a computer display monitor, television, or projector for example. The receiver indicates that it can strip auxiliary data, and may specify the maximum width of each auxiliary period to transmitter 100, using display properties device 405. For example, one or more capability fields in a monitor descriptor block of extended display identification data (EDID) may be stored in a memory, such as a programmable read-only memory (PROM) in device 405. The display properties data may be stored in the PROM using a Video Electronics Standards Association (VESA) standard such as EDID 1.2 or 1.3 for example. The fields may be used to indicate the capability to process auxiliary data. The capability fields may also indicate the allowable width of the auxiliary DE periods, or simply that such periods are allowed and the width is encoded in the period itself. EDID 1.2 or 1.3 can be used to list the timing modes supported by the display. The host side may limit its output of data to those modes. In addition, EDID may encode other feature bits to indicate the type of auxiliary features it supports.

For example, a 128-byte EDID may allow space for four detailed timing descriptors. Additional descriptors may be loaded into PROM above 128 bytes if enough memory space is available in the PROM. A resolution may be defined for each possible host-side graphics resolution, or mode, which also allows merging of the auxiliary data signal onto the video data signal. For example, to support ten established graphics modes, 10 graphics descriptors may be defined. Alternatively, only a subset of all the graphics modes may be used to support auxiliary data.

In one embodiment, an explicit indication of the capability to process auxiliary data allows the host to transmit the auxiliary data in a composite data signal format. Because the capability fields may not be expected or supported by legacy system transmitters, these fields may be ignored by legacy system transmitters. Also, a modification to existing non-auxiliary data capable receivers can allow them to automatically strip off a received DE pulse that has a duration that is shorter than a specified limit. The limit may be stored in a register and may be shorter than a valid video mode line length.

According to VESA standards for receivers such as DVI 1.0 display devices, the transmitter may send a query to the receiver when the transmitter is turned on, or when the transmitter detects that a receiver has been physically connected to the transmitter where there had previously been no connection between the transmitter and receiver, such as a hot plug detection, for example. The receiver responds to the query from the transmitter by sending display properties data to the transmitter. The display properties data may indicate the capabilities of the display subsystem of the receiver, according to design features. The query and the response may be transmitted using display data channel (DDC) protocol and inter-IC (I2C) bus signal timings, for example.

As shown in FIG. 4A, the display properties data may be transmitted to the transmitter side by display properties indicator on signal 175, which is sent by indicator 405 to the transmitter, so that the transmitter has information about the features of the display on the receiver side, and does not transmit data that the receiver is not able to process. Therefore, if the transmitter does not receive information from the receiver's display properties device indicating that the receiver can process auxiliary data, the transmitter, or host, may not transmit the auxiliary data to the receiver. Alternatively, the receiver may determine that the display subsystem cannot process the auxiliary data. In this embodiment, the host may transmit the auxiliary data on a composite data signal. However, receiver may detect the auxiliary data, separate the auxiliary data from the composite data signal using decoder 410, control logic 420, and demultiplexer 430 as discussed below, and then not send the auxiliary data to a auxiliary data sink. Thus, because the display subsystem cannot process the auxiliary data, the receiver does not further process or use the auxiliary data after the auxiliary data is removed from the composite data signal.

The encoded data signal 155 is decoded by the decoder 410, which passes the decoded composite data enable signal 447 to the receiver DE Out Control Logic block 420, and the decoded composite data signal 445 to the demultiplexer (DEMUX) 430. The receiver DE Out Control Logic 420 separates the decoded video DE signal from the decoded auxiliary DE signal and outputs video and auxiliary DE signals 417 and 427 to the video data sink 440 and auxiliary data sink 450, respectively. The DE Out Control Logic 420 also outputs a demultiplexer control signal 421 to control the DEMUX 430, so that the DEMUX outputs video data 415 from composite data signal 445 to the video data sink 440, and outputs auxiliary data 425 from composite signal 445 to auxiliary data sink 450.

Figure 6:
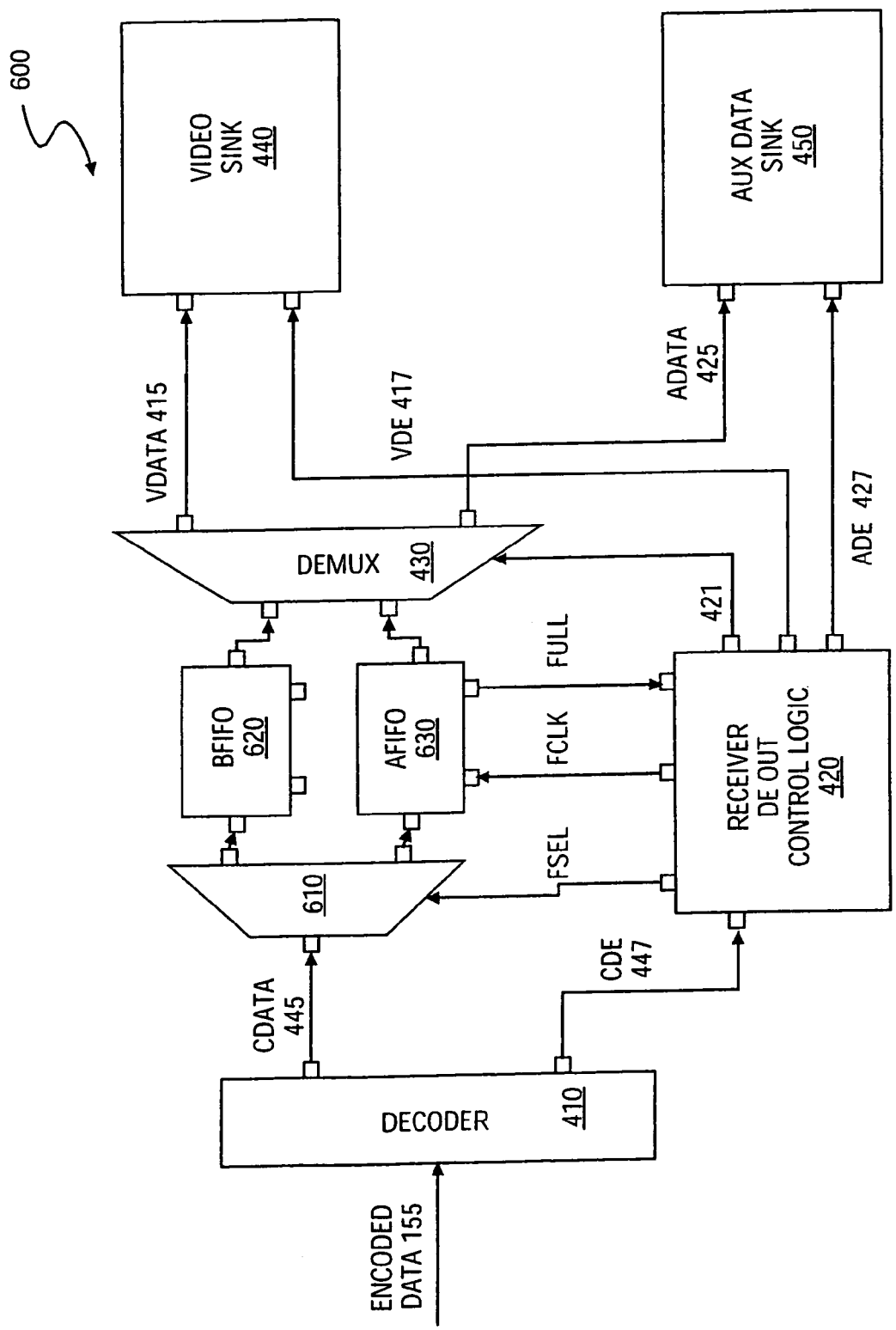
FIG. 6 shows an embodiment of a receiver that includes buffers to enable the receiver to distinguish video data from auxiliary data.

If the VDE and ADE pulses of CDE 147 are separated by a discrete amount of time as shown in FIG. 2, the DE Out Control Logic 420 can detect the difference between video data and auxiliary data by measuring each DE period in the composite data enable signal 447. If the ADE pulses are shorter than the VDE pulses, the receiver can distinguish the auxiliary data periods from the video data periods by measuring the width or duration (such as number of clock cycles that the DE signal is high for example) of each pulse in the CDE signal. The shorter DE pulses can then be identified as ADE pulses, and the longer pulses can be identified as VDE pulses, by the receiver. By storing the decoded data signal in a temporary buffer as shown in FIG. 6, the receiver can determine if the data signal is auxiliary data or video data based on the length of the corresponding data enable signal. The shorter, non-overlapping auxiliary periods are separated from the composite signal to form auxiliary data output stream 425. The remaining video periods form video data output stream 415.

If the ADE is pre-pended onto the VDE to form CDE 147, and the auxiliary data signal is pre-pended onto the video data signal to form composite data signal 145 as shown in FIG. 3, the receiver may detect the presence of the pre-pended auxiliary data by measuring the width of a CDE pulse. The width can be measured by counting the number of clock cycles during which the CDE pulse is high. If the width of the CDE pulse does not match the width of a VDE pulse corresponding to one of a set of supported video modes for that display device, then the extra cycles of high time within the CDE pulse that go beyond the high time of a supported VDE pulse are interpreted as an auxiliary DE signal. The corresponding data from composite data signal 145 can be identified as auxiliary data and stripped off of the composite data signal. This leaves the video data, with the corresponding VDE signal, to be output to the display, while the auxiliary data (and ADE) are output from the receiver to the auxiliary data sink on a separate path.

Before the transmitter pre-pends the auxiliary data signal onto the video data signal, the display device indicates to the transmitting device the set of video modes the display device supports, as part of the normal initialization process as defined, for example, in the DVI 1.0 specification, using signal 175 as discussed above. When the transmitter sends auxiliary data pre-pended to the video data in one of these supported video modes, the transmitter does not generate a CDE signal that matches the duration of one of the other video modes. If it were to do so, the receiver may misinterpret the composite data signal as a video signal in a mistaken video mode. For example, if the receiver supports two video modes with active times of 1024 and 1280 clocks, respectively, then the transmitter may pre-pend auxiliary data to a video mode of 1024 clocks, yet not construct a signal which is 1280 clocks in width.

The data enable signals permit the receiver to separate the video data signal from the auxiliary data signal. The video data enable signal permits the receiver to determine the length of the video data period, and consequently the length of the video blanking period. Furthermore, the auxiliary data enable signal permits the receiver to identify the length of the auxiliary data period within the video blanking period. Therefore, the receiver can identify and process the auxiliary data using one or both of the data enable signals even if the length of the blanking period is unpredictable, and does not occur at regular, periodic intervals. Also, the receiver can process and output the auxiliary data using one or both of the data enable signals even if the video signal or a control signal, such as Hsync for example, is erroneous.

Furthermore, the receiver can distinguish the auxiliary data from the video data by determining whether the corresponding data enable signal is an ADE signal or a VDE signal. Therefore, the receiver does not need to analyze the data signal itself to determine whether the received data is video or auxiliary data. The receiver can make this determination based on the length of the corresponding data enable signal. The receiver may detect the auxiliary data periods, or packets, in the received data signal and divert the corresponding auxiliary data to a secondary output stream, leaving the video data intact on a primary, or video, output stream of data. Because the auxiliary data period can be identified by the ADE signal, additional data such as control data for example, can be transmitted during the remaining unused portion of the video blanking period. The receiver can distinguish the auxiliary data from the additional data using the ADE signal.

Figure 4B:
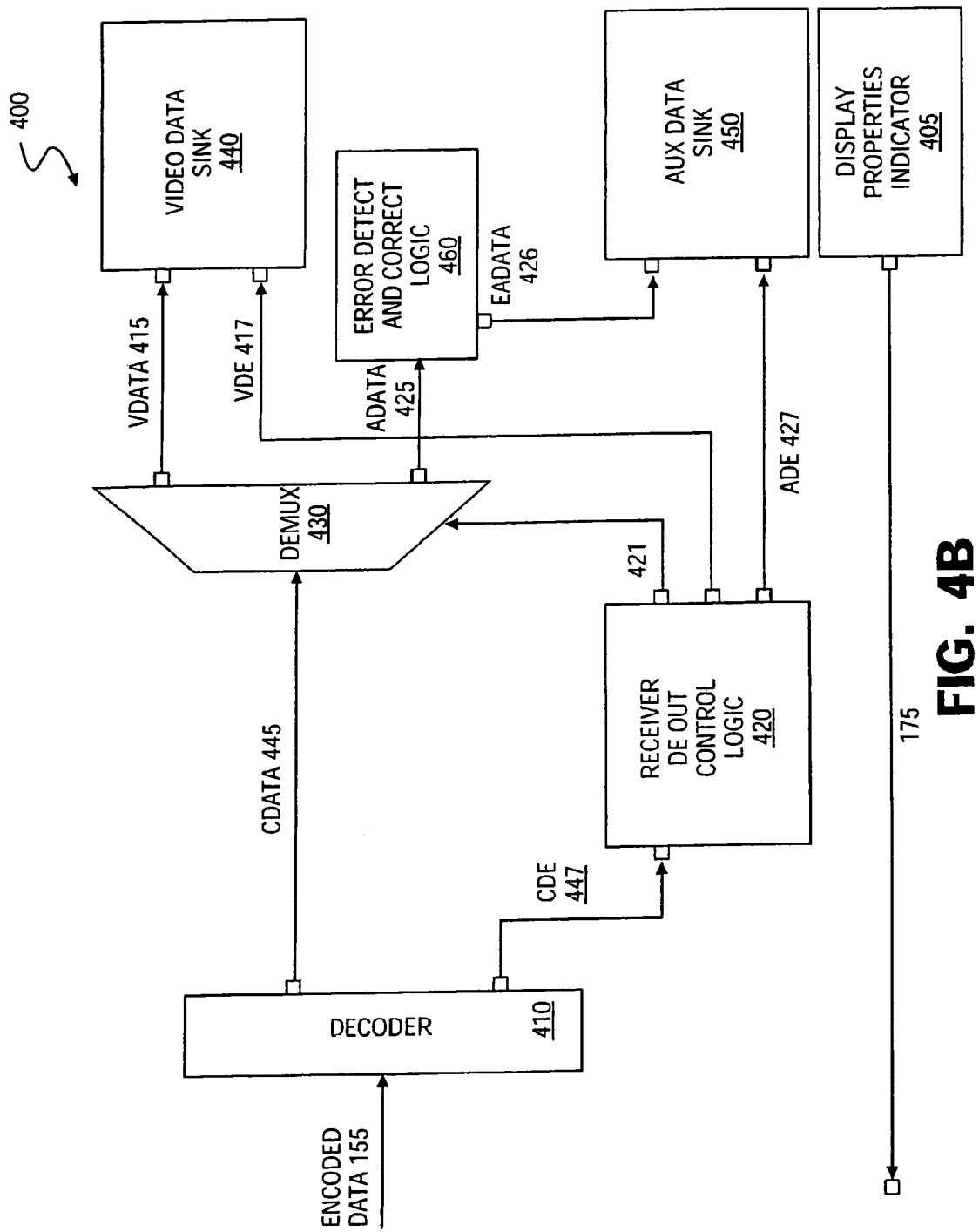

In one embodiment, as shown in FIG. 4B, the auxiliary data signal 425 is sent from demux 430 and received by error detect and correct logic 460. If the auxiliary data includes error detection data, the logic 460 may determine whether the received auxiliary data is erroneous. In one embodiment, if the auxiliary data is erroneous, the receiver may not use the erroneous auxiliary data. In one embodiment, if the auxiliary data includes error correction data, and the logic 460 includes error correction logic, the logic 460 may correct the received auxiliary data and output error corrected auxiliary data (EAdata) 426 to auxiliary data sink 450.

Figure 5:
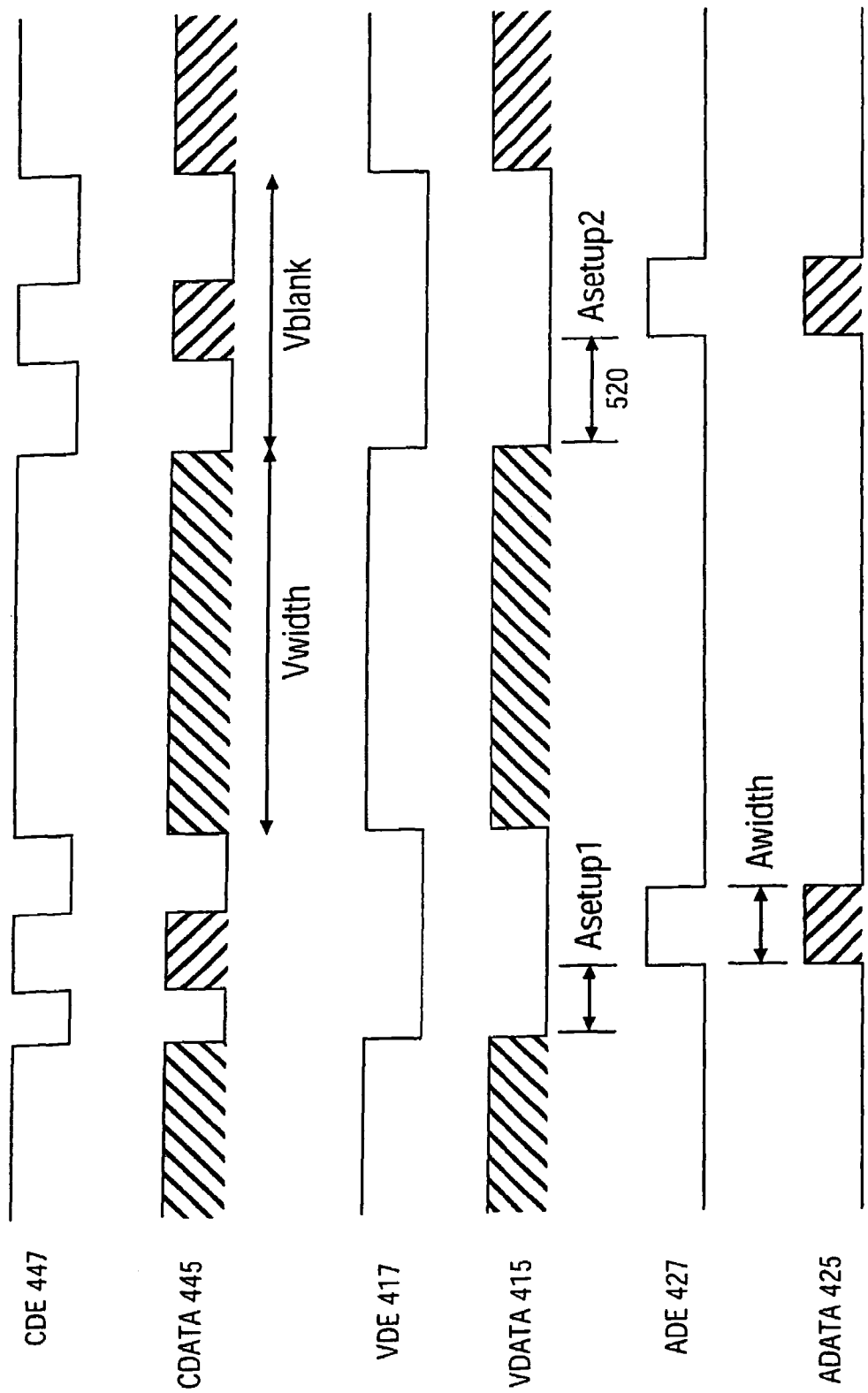
FIG. 5 shows examples of data signals including auxiliary data signals that may be received on a TMDS data stream.

FIG. 5 shows examples of signals that may be processed by receiver 400 discussed above. Auxiliary data 425 may be removed from the composite data signal 445 without the need for auxiliary control signals. The bandwidth available for auxiliary data may be calculated from the low times of the VDE signal 417. No auxiliary control signals are needed as inputs to the decoder. The decoding system may be able to distinguish between video data 415 and auxiliary data 425 by measuring the width of each data pulse. Because the width of each video data pulse is larger than the width of each auxiliary data pulse, the auxiliary data can be demultiplexed from composite signal 445 to output auxiliary data signal 425 to an auxiliary data sink and to output video data signal 415 to a video data sink using decoder 400 as discussed above. The corresponding auxiliary data enable signal 427 and video data enable signal 417 can similarly be demultiplexed from composite data enable signal 447. The auxiliary data periods may be inserted in the video blanking period, even at times which are not repeated at the same clock count in every VDE low period. That is, the auxiliary data periods do not have to be periodic or predictable. For example, the location of Asetup period 510 within the video blanking period need not match that of Asetup period 520.

FIG. 6 shows an embodiment of a receiver 600 that includes buffers to enable the receiver to distinguish video data from auxiliary data. The auxiliary data periods may follow one another within a few clock cycles. Decoder 410 receives encoded signal 155 and outputs decoded composite signal 445 and decoded composite data enable signal 447. Composite signal 445 is received by multiplexer 610 and is routed to buffer 620 or buffer 630, or to both buffers. Each buffer may be a first-in, first-out (FIFO) buffer, for example. Buffer 630 may be able to store less data than buffer 620. In one embodiment, buffer 630 may be able to store data from one auxiliary data period. Thus, if a data period ends before buffer 630 is full, then the data period is an auxiliary data period. Control logic 420 causes demux 430 to route the auxiliary data from buffer 630 to auxiliary data sink 450 using control signal 421.

If the buffer 630 becomes full before the data period ends, then the data period is a video data period, and buffer 620 stores the data from the video period. A full signal is sent from buffer 630 to control logic 420, indicating that buffer 630 is full and the data period is a video data period. Control logic 420 then sends a control signal 421 to demux 430 that causes the demux to route the video data from buffer 620 to video data sink 440. The buffer 620 may introduce a pipeline delay in the Cdata-to-Vdata signal path according to the depth of the buffer. This pipeline delay may not be a problem, because the DE and synchronization (sync) signals for the video data can also be delayed by the same number of clock cycles.

Figure 7:
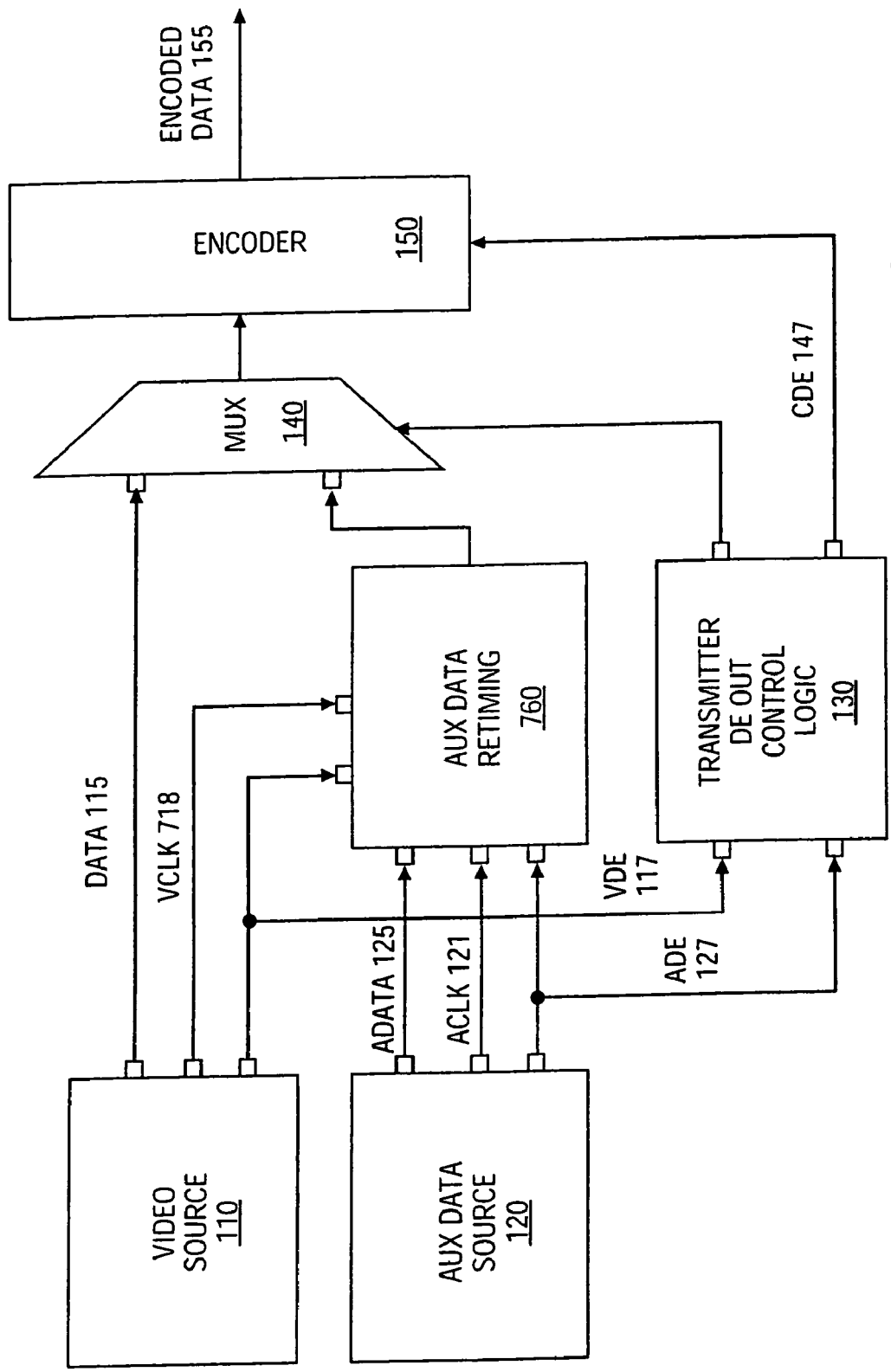
FIG. 7 shows an embodiment of a transmitter that allows retiming of the auxiliary data.

FIG. 7 shows an embodiment of a transmitter 700 that allows retiming of the auxiliary data. Video data is received from video data source 110. Auxiliary data is received from auxiliary data source 120. If the auxiliary data and the video data are received at the same time, then the auxiliary data can be delayed by the transmitter auxiliary data retiming block 760, which may be a buffer for example, until there is a break in the reception of video data. The break, or video blanking period, may be detected by monitoring the video data enable (VDE) signal 117 for example. The auxiliary data may be clocked into the retiming block 760 with the auxiliary clock signal (ACLK) 728 and clocked out of the retiming block with the video clock signal (VCLK) 718.

Figure 8:
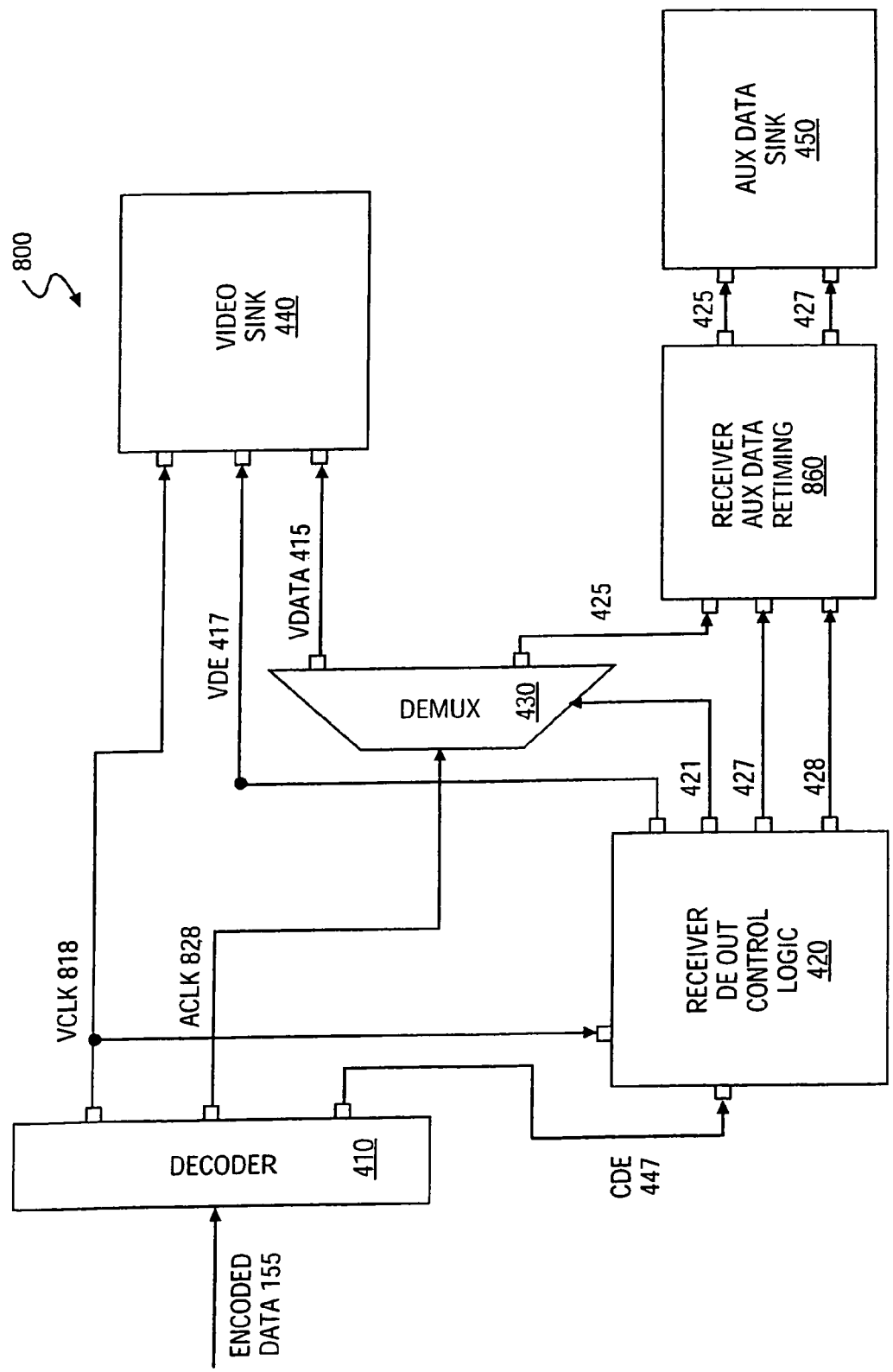
FIG. 8 shows an embodiment of a receiver that allows retiming of the auxiliary data.

FIG. 8 shows an embodiment of a receiver 800 that allows retiming of the auxiliary data. If the auxiliary data needs to be output to auxiliary data sink 450 at the same time that video data is output to video data sink 440, then the auxiliary data can be delayed by the receiver retiming block 860, which may be a buffer for example, so that the auxiliary data can be output at the appropriate time. For example, the VDE signal may be monitored to detect a video blanking period, and the auxiliary data may then be output during the video blanking period.

The auxiliary data may be audio data for example. In one embodiment, the auxiliary data may also include a checksum or other integrity field. For example, certain kinds of data, such as "command type" data for example, may need to be accurately captured. Thus, error detection and correction, such as a checksum for example, can be sent in the auxiliary data packet to increase the accuracy of the data transferred from the transmitter to the receiver. The error detection and correction process may use additional logic or parallel bits added to the auxiliary data field. Thus, errors can be detected and corrected so that re-transmission of the data is not needed. Eliminating or reducing re-transmission may be desired because re-transmission may not be easy in a TMDS link. For example, the TMDS system may not include a synchronized reverse channel to indicate errors in original transmission.

Figure 9:
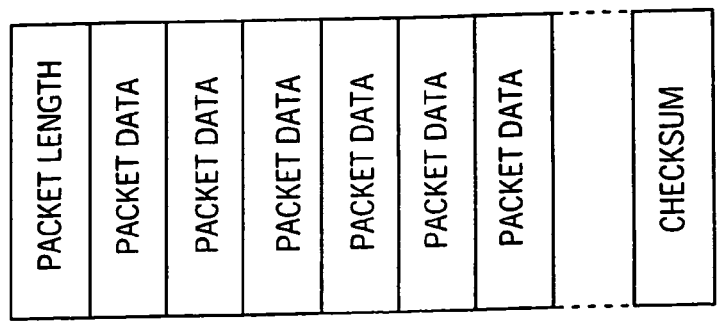
FIG. 9 shows an embodiment of an auxiliary data packet.

The auxiliary data packet may be formatted as shown in FIG. 9. Error detection data may be included in the packet. For example, a value for the length of the packet is included in the packet, for example by placing a packet length data field at the beginning of the packet, and inserting the packet length data into the field. This length data may be represented as "length of packet minus one," which may simplify the logic. The error detection data may also include a checksum data field, which may be placed at the end of the packet, for example. Checksum data is placed in the checksum data field. The length data and the checksum data may be used to determine whether the received auxiliary data packet is erroneous. In another embodiment, the auxiliary data packet may not contain an error detection data field. An error in the received auxiliary data may be detected by determining the length of the auxiliary data packet, for example by monitoring the rising edge and falling edge of the auxiliary data enable signal, and comparing the determined length with a stored packet length limit value. Other suitable methods of error detection may also be used.

Error correction can be performed by including extra bits in the stream of data information. Thus, each packet may also include error correction data. For example, an error correction data field may be placed at the end of the auxiliary data packet, and the error correction data, such as extra bits, may be placed into the error correction data field. These extra bits of error correction data may be set or cleared in a manner dependent on the states of the auxiliary data bits. The presence and location of an erroneous bit may be revealed by the united value of the error correction and auxiliary data bits. Thus, an erroneous bit may be detected and corrected (i.e., set to the opposite state) by this procedure. Other suitable methods of error correction may also be used.

Figure 10:
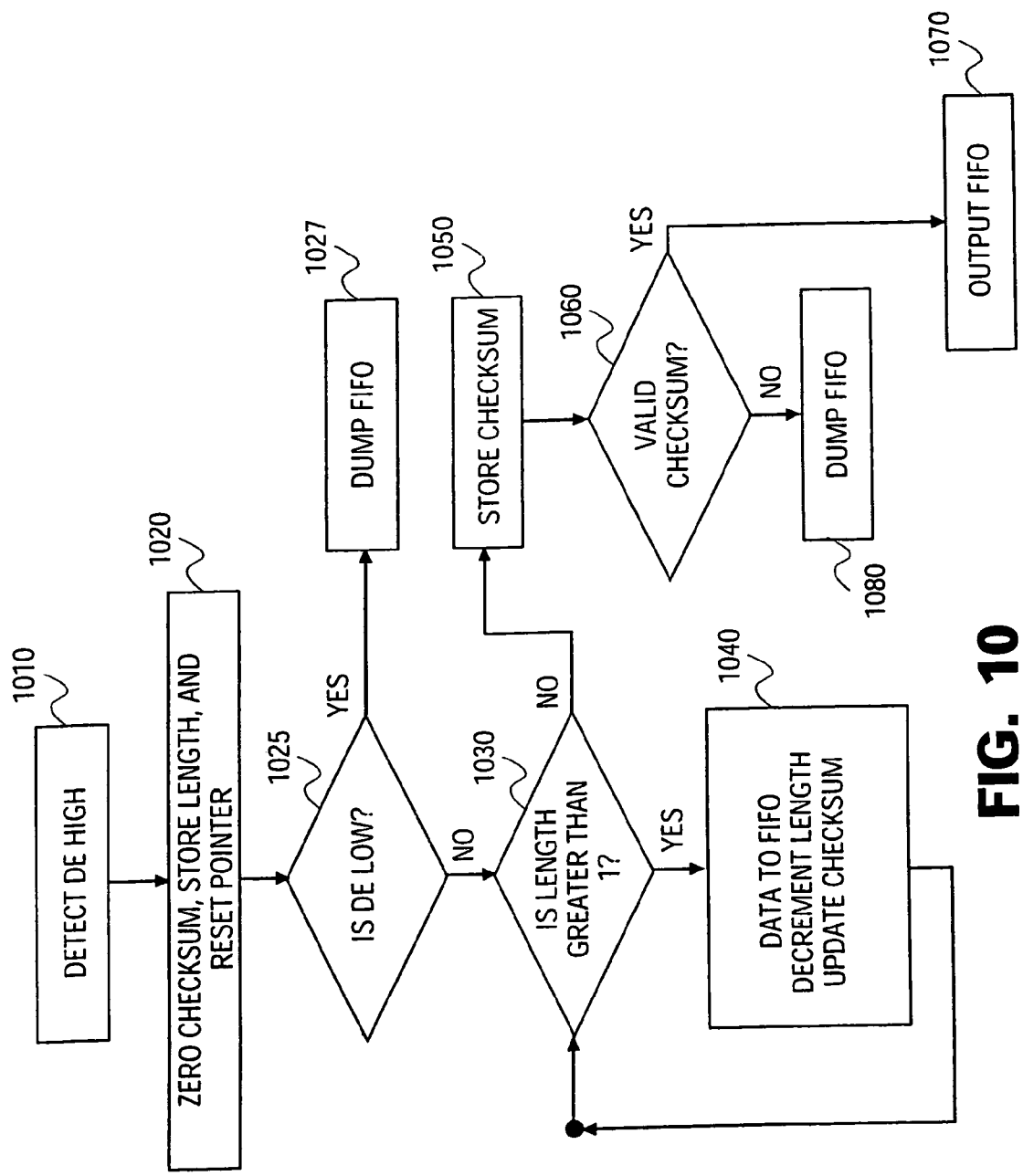
FIG. 10 shows an embodiment of a process for receiving and processing auxiliary data.

FIG. 10 shows an embodiment of a process for determining whether a received auxiliary data packet contains an error. A DE high period is detected, 1010. The packet length is saved, the checksum calculation is initialized and the buffer pointer is reset to the beginning of the buffer, 1020. Whether the DE period is high or low is determined, 1025. If the DE period becomes low before the end of the packet is received, the received data stored in the buffer may be dumped, 1027. Otherwise, whether the packet length is greater than one is determined, 1030. If the length is greater than one, a packet data value is loaded into the buffer, the length is decremented by one, and the checksum calculation is updated, 1040. If the length is not greater than 1, the last data value is the expected checksum, which is stored, 1050. The stored checksum value is compared to the checksum calculation value to determine whether the values match, 1060. If the values match then the data stored in the buffer can be clocked out (on subsequent clocks, or even asynchronously with a separate clock) to a data sink until the buffer is empty, 1070. If the checksum values do not match then the data in the buffer may be corrupted and is dumped as unused data, 1080.

The process may allow multiple auxiliary data packets to follow one another between normal video data periods. The process may be enhanced to allow an auxiliary packet to be transmitted during multiple ADE high periods, allowing one packet length and one checksum value. Loading data into the buffer is interrupted when ADE is low. The auxiliary data can be transmitted during a portion of the unused VDE period. Auxiliary data may be audio data, brightness data used in display logic, or command data (which may need error-detection and correction to prevent misunderstood commands)

which change the logic states in the overall display logic (such as commanding a microcontroller in the display).

Figure 11:
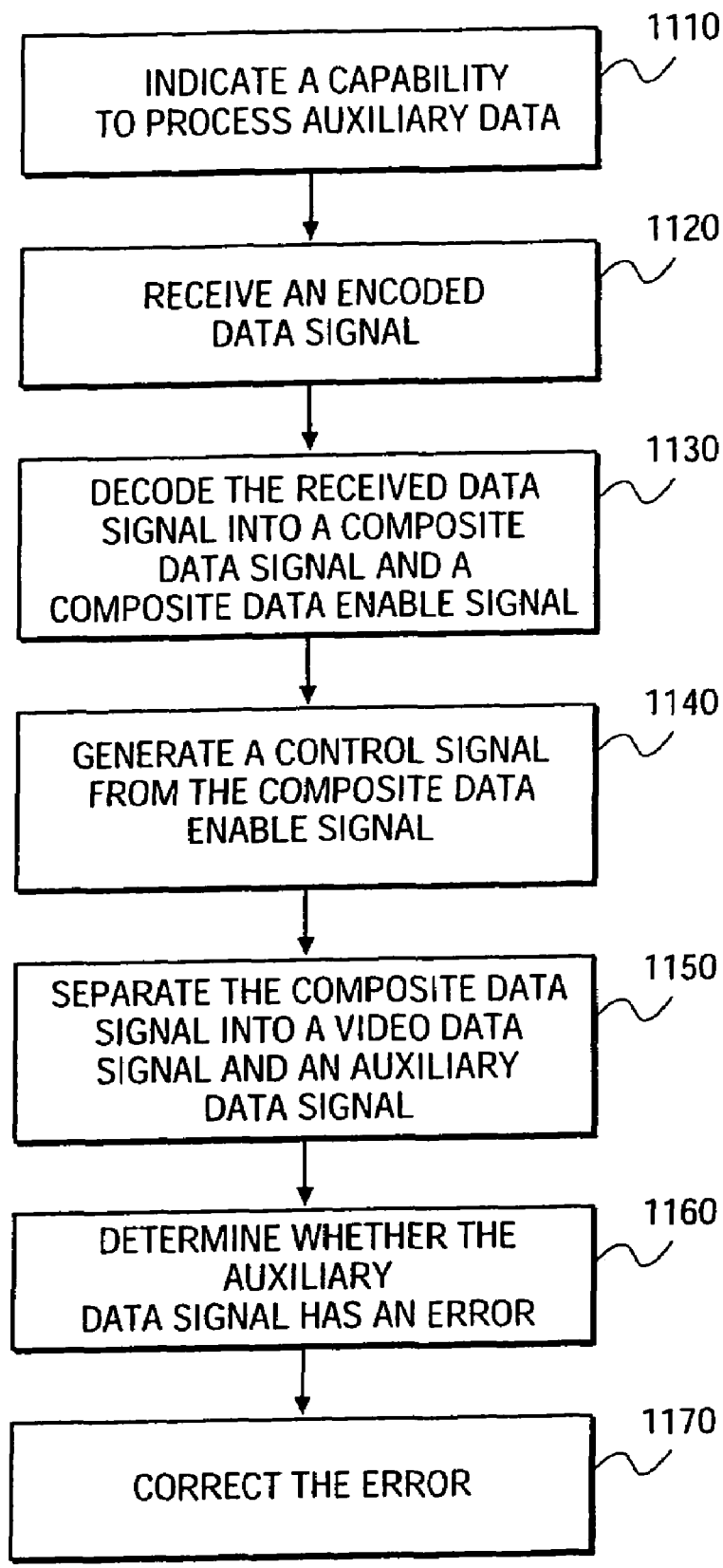
FIG. 11 shows another embodiment of a process for receiving and processing auxiliary data.

FIG. 11 shows another embodiment of a process for receiving and processing auxiliary data. A capability to process auxiliary data is indicated, 1110. An encoded data signal is received, 1120. The received data signal is decoded into a composite data signal and a composite data enable signal, 1130. A control signal is generated from the composite data enable signal, 1140. The composite data signal is separated into a video data signal and an auxiliary data signal using the control signal, 1150. Whether the auxiliary data signal has an error is determined, 1160. Whether the auxiliary data signal contains an error may be determined by comparing an auxiliary data length value in an auxiliary length data field of the auxiliary signal to the actual length of the received auxiliary data signal. If the auxiliary data length value is not equal to the actual length of the received auxiliary data signal, then the received signal contains an error. The error in the auxiliary data signal is corrected, 1170.

By integrating the error detection and correction into the auxiliary data as described above to enhance the auxiliary data, and by transmitting the enhanced auxiliary data on the TMDS data signal, the error detection and correction data is transmitted at the same rate as the video data. Thus, the error detection and correction performance of the system is not limited by the processing power of the host transmitter. The system also does not need to add additional signals to the existing video interface to perform error detection and correction, nor does the system require additional cables to provide a communication channel from receiver to host (a "back channel"). Also, the system does not require additional error detection or correction logic outside of the transmitter, receiver and TMDS link.

As discussed above, sending data over a high-speed digital communication link, such as a video link, may involve the encoding of data. An example of encoding is transition minimized differential signaling (TMDS). The digital visual interface (DVI) specification, which is based on TMDS, is a standard for a digital display serial communication link. In one embodiment, a TMDS transmission system includes more than one encoder and each encoder encodes 8-bits of a video data signal, one or more data enable (DE) signals, and 2 bits of control signals. These signals are transmitted over four pairs of signal wires. One pair sends clock signals, the other three pairs send data signals. The three data pairs send video data, auxiliary data, and special characters. The special characters represent control signals and the DE signals. The three data pairs may be termed channels 0, 1, and 2.

The TMDS transmitter can encode the video data, auxiliary data, and the special characters as DC-balanced encoded data. The auxiliary data can then be transmitted along with the video data and special characters within the serialized data stream and received by a display device. In a TMDS link the control signals, such as the Hsync and Vsync signals, are encoded onto the data stream in the video blanking period if the DE signal remains low. Auxiliary data can be inserted at a location in the blanking period of the data stream as long as the location does not coincide with a location of a control signal. Therefore, the auxiliary data can be transmitted on the data stream when there is no video data or video control signals, such as Vsync or Hsync, being transmitted on the data stream. Alternatively, the control signals such as the Vsync and Hsync signals, can be transmitted within the auxiliary data signal. For example, if the transmitter identifies or determines by measurement the location of the Hsync and Vsync signals, the transmitter can send control signal descriptor data to the receiver by adding this descriptor data to the auxiliary data signal. Thus, by using the descriptor data, the receiver can reconstruct the control signals, such as the Hsync and Vsync signals, without the control signals being explicitly transmitted and received on the encoded serial link. The video signal stream can be separated from the control signal stream using a DE signal. Also, the video data stream can be separated from the auxiliary data stream using a DE signal. Thus, the auxiliary data may be sent from a transmitter to a receiver, such as a display, on the TMDS data stream without affecting the video or control signals.

These and other embodiments of the present invention may be realized in accordance with the teachings described herein and it should be evident that various modifications and changes may be made in the teachings without departing from the broader spirit and scope of the invention. The specification and drawings are, accordingly, to be regarded in an illustrative rather that restrictive sense and the invention measured only in terms of the claims.

I claim:

1. A method comprising:
   generating a control signal from an auxiliary data enable signal and a video data enable signal; and
   combining an auxiliary data signal and a video data signal into a composite data signal using the generated control signal;
   the video data enable signal indicating a period of time during which the video data signal is being transmitted in the composite data signal, and the auxiliary data enable signal indicating a different period of time during which the auxiliary data signal is being transmitted in the composite data signal;
   transmitting the composite data signal over a communications link; and
   receiving and separating the received composite data signal into a separate received video data signal and a separate received auxiliary data signal using the control signal so that the auxiliary data signal may be communicated over a single communication link with the video data signal without affecting the video data signal.

2. The method of claim 1, wherein the auxiliary data signal is one of (i) appended at an end of the video data signal and (ii) pre-pended to a beginning of the video data signal to form the composite data enable signal.

3. The method of claim 1 further comprising:
   receiving an encoded data signal; and
   decoding the encoded data signal into the composite data enable signal and the composite data signal.

4. The method of claim 1 further comprising: determining whether the auxiliary data signal contains an error.

5. The method of claim 4 wherein the auxiliary data signal contains an error, further comprising: correcting the error in the auxiliary data signal.

6. The method of claim 1, further comprising:
   receiving the composite data enable signal prior to generating the control signal, the received composite data enable signal having a first data enable pulse and a second data enable pulse;
   determining a first duration corresponding to the first data enable pulse;
   determining a second duration corresponding to the second data enable pulse; and
   identifying a video data enable signal and an auxiliary data enable signal based on the first and second duration.

7. The method of claim 6 wherein identifying further comprises determining which duration is longer.

8. The method of claim 7 wherein the video data enable signal is identified by the longer duration.

9. The method of claim 6 further comprising:
receiving a composite data signal; and
separating the composite data signal into a video data signal and an auxiliary data signal based on the video data enable signal and the auxiliary data enable signal.

10. The method of claim 1, further comprising:
receiving the composite data enable signal prior to generating the control signal, the composite data enable signal having a pulse;
determining a duration of the pulse;
identifying a video data enable signal in the pulse based on the duration of the pulse; and
identifying an auxiliary data enable signal in the pulse based on the duration of the pulse.

11. The method of claim 10, further comprising:
receiving a composite data enable signal;
identifying a video data signal in the composite data signal using the video data enable signal; and
identifying an auxiliary data signal in the composite data signal using the auxiliary data enable signal.

12. The method in claim 10, further comprising:
generating a control signal from the video data enable signal and the auxiliary data enable signal; and
combining the video data signal and the auxiliary data signal into a composite data signal using the generated control signal.

13. The method of claim 12, further comprising:
receiving an indication signal to indicate a capability to process the auxiliary data signal; and
generating an auxiliary data permitted signal to permit the auxiliary data signal to be combined with the video data signal in response to the indication signal.

14. The method of claim 12, further comprising:
generating a composite data enable signal from the video data enable signal and the auxiliary data enable signal;
encoding the composite data signal and the composite data enable signal into an encoded data signal; and
transmitting the encoded data signal.

15. The method of claim 12, further comprising: adding error detection data to the auxiliary data signal.

16. A method of claim 15, further comprising: adding error correction data to the auxiliary data signal.

17. The method in claim 1, wherein the video data signal and the auxiliary data signal include an auxiliary data packet comprising a length data field and one or more data packets, wherein the length of the auxiliary data packet is entered into the length data field, and further wherein an auxiliary data source transmits the auxiliary data packet for multiplexing with the video data signal during periods when a video data enable signal is low.

18. The method in claim 17, wherein the auxiliary data packet further comprising a checksum data field, wherein checksum data is entered into the checksum data field.

19. The method in claim 1, wherein the video data signal and the auxiliary data signal include an auxiliary data packet comprising one or more data packets and an error correction data field, wherein extra bits are entered into the error correction data field, and further wherein an auxiliary data source transmits the auxiliary data packet for multiplexing with the video data signal during periods when a video data enable signal is low.

20. An apparatus comprising:
a control device to generate a control signal from an auxiliary data enable signal and a video data enable signal;
a multiplexer for combining an auxiliary data signal and a video data signal into a composite data signal using the generated control signal;
the video data enable signal indicating a period of time during which the video data signal is being transmitted in the composite data signal, and the auxiliary data enable signal indicating a different period of time during which the auxiliary data signal is being transmitted in the composite data signal;
a transmitter for transmitting the composite data signal over a communications link; and
a receiver for receiving the composite data signal from over the communications link;
the receiver including a demultiplexor to separate the composite data signal into a separate received video data signal and a separate received auxiliary data signal using the control signal so that the auxiliary data signal may be communicated over a single communication link with the video data signal without affecting the video data signal.

21. The apparatus of claim 20, wherein the auxiliary data signal is one of appended at an end of the video data signal and pre-pended to a beginning of the video data signal to form the composite data enable signal.

22. The apparatus of claim 20 further comprising: a decoder to receive an encoded data signal, and to decode the received data signal into the composite data enable signal and the composite data signal.

23. The apparatus of claim 20 further comprising: an error detector to determine whether the auxiliary data signal contains an error.

24. The apparatus of claim 23, further comprising: an error corrector to correct an error in the auxiliary data signal.

25. The apparatus of claim 20, further comprising:
means for receiving the composite data enable signal prior to the control device generating the control signal, the received composite data enable signal having a first data enable pulse and a second data enable pulse;
means determining a first duration corresponding to the first data enable pulse;
means determining a second duration corresponding to the second data enable pulse; and
identifying means for identifying a video data enable signal and an auxiliary data enable signal based on the first and second durations.

26. The apparatus of claim 25 wherein the identifying means further determines which duration is longer.

27. The apparatus of claim 26 wherein the video data enable signal is identified by the longer duration.

28. The apparatus of claim 25 further comprising:
means for receiving a composite data signal; and
means for separating the composite data signal into a video data signal and an auxiliary data signal based on the video data enable signal and the auxiliary data enable signal.

29. The apparatus of claim 20, further comprising:
means receiving the composite data enable signal prior to generating the control signal, the received composite data enable signal, the composite data enable signal having a pulse;
means for determining a duration of the pulse;
means for identifying a video data enable signal in the pulse based on the duration; and
means for identifying an auxiliary data enable signal in the pulse based on the duration.

30. The apparatus of claim 29, further comprising:
means for receiving a composite data signal;
means identifying a video data signal in the composite data signal using the video data enable signal; and means identifying an auxiliary data signal in the composite data signal using the auxiliary data enable signal.

31. The apparatus in claim 29, further comprising:
means for generating a control signal from the video data enable signal and the auxiliary data enable signal; and
means for combining the video data signal and the auxiliary data signal into a composite data signal using the generated control signal.

32. The apparatus of claim 31, further comprising:
means for receiving an indication signal to indicate a capability to process the auxiliary data signal; and
means for generating an auxiliary data permitted signal to permit the auxiliary data signal to be combined with the video data signal in response to the indication signal.

33. The apparatus of claim 31, further comprising:
means for generating a composite data enable signal from the video data enable signal and the auxiliary data enable signal;
encoding the composite data signal and the composite data enable signal into an encoded data signal; and
transmitting the encoded data signal.

34. The apparatus of claim 31, further comprising: means for adding error detection data to the auxiliary data signal.

35. The apparatus of claim 34, further comprising: means for adding error correction data to the auxiliary data signal.

36. A receiver for receiving video data and auxiliary data comprising:
a receiver control logic device having an input to receive a composite data enable signal, the receiver control logic device to separate the composite data enable signal into an auxiliary data enable signal and a video data enable signal, and to generate a control signal using the composite data enable signal;
the video data enable signal indicating a period of time during which the video data signal is being transmitted in the composite data signal, and the auxiliary data enable signal indicating a different period of time during which the auxiliary data signal is being transmitted in the composite data signal; and
a demultiplexer having an input to receive a composite data signal and an input to receive the control signal from the receiver control logic device, the demultiplexer configured to separate the composite data signal into an auxiliary data signal and a video data signal based on the control signal, the composite data enable signal having a pulse with a pulse duration; and
means for identifying the video data enable signal in the pulse based on the duration of the pulse; and
means for identifying an auxiliary data enable signal in the pulse based on the duration of the pulse.

37. The receiver of claim 36 further comprising:
a decoder having an input to receive an encoded data signal, the decoder to decode the encoded data signal into a composite data signal and a composite data enable signal.

38. The receiver of claim 36 further comprising:
a display property device to output a display property signal to indicate that the receiver can process auxiliary data.

39. The receiver of claim 36 further comprising:
an error detection and correction logic device having an input to receive the auxiliary data signal from the demultiplexer, to determine whether the auxiliary data signal contains an error, and if the auxiliary data signal contains an error, to correct the error.

* * * * *